G. Y. CUSTER.
Lamp.

No. 36,206

Patented Aug. 19, 1862.

Witnesses:
Charles E. Foster
Jas. B. Shieglin

Inventor:
Henry Howson
Atty for G. Y. Custer

UNITED STATES PATENT OFFICE.

GEORGE Y. CUSTER, OF NORRISTOWN, PENNSYLVANIA.

IMPROVEMENT IN COAL-OIL LAMPS.

Specification forming part of Letters Patent No. 36,206, dated August 19, 1862.

*To all whom it may concern:*

Be it known that I, GEORGE Y. CUSTER, of Norristown, Montgomery county, Pennsylvania, have invented an Improvement in Coal-Oil Lamps; and I do hereby declare the following to be a full, clear, and exact description of the same, reference being had to the accompanying drawings, and to the letters of reference marked thereon.

My invention relates to an improvement in the burners of coal-oil lamps; and my improvement consists of a reservoir containing a supply of water, and arranged immediately below the perforated air chamber of a coal-oil lamp in respect to the wick-tube, as described hereinafter, so that the heat imparted to the water will generate steam, and this steam mixed with the air will impinge against the base of the flame and render the latter more clear and brilliant, at the same time preventing the disagreeable smell, so objectionable in lamps of this class.

In order to enable others skilled in the art to make and use my invention, I will now proceed to describe its construction and operation.

Figure 1:
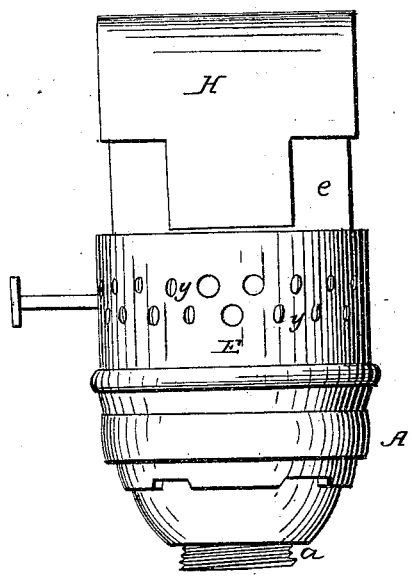
Figure 2:
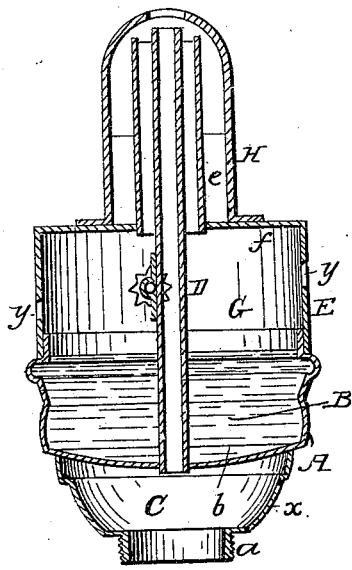
Figure 3:
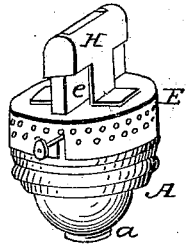

On reference to the accompanying drawings, which form a part of this specification, Figure 1 is a side view of my improved burner for coal-oil lamps; Fig. 2, a vertical section, and Fig. 3 a perspective view.

Similar letters refer to similar parts throughout the several views.

A is the base of the burner, having the usual hollow projection, *a*, for screwing into the top of the reservoir containing the supply of coal-oil. This base is divided into two compartments, B and C, by a partition, *b*, the lower compartment forming a chamber, to which air has access through a hole, *x*, and the upper compartment serving as a reservoir for containing a supply of water.

To the partition *b* is secured the ordinary flat wick-tube, D, which is furnished with the usual cog-wheel and spindle for raising and lowering the wick. To the upper edge of the reservoir B is fitted the inverted cup E, forming a chamber, G, to which the air has access through a series of perforations, *y*, and to the top F of this chamber is secured a tube, *e*, between which and the wick-tube intervenes a space for the passage of the air admitted to the chamber G upward to the base of the flame. To the top of the chamber G is also secured a cap, H, the form of which will be best understood on reference to the perspective view, Fig. 3. As this cap forms no part of my present improvements, it will suffice to remark that it serves to direct a supply of air to the flame independently of the air which passes from the chamber G between the wick-tube and the tube *e*.

I have found by repeated experiments that a supply of water beneath the perforated air-chamber of the lamp tends to render the flame more clear and brilliant and to prevent the smoke and disagreeable smell, which is the great objection to coal oil lamps. This result is owing to the steam which is generated from the water, and which mixing with the air impinges with the latter against the base of the flame.

My improved burner is so free from smoke that I am enabled to use it without the ordinary glass chimney.

I claim as my invention and desire to secure by Letters Patent—

The reservoir B, containing a supply of water and arranged immediately below the perforated air-chamber G of a coal-oil lamp in respect to the wick-tube, as and for the purpose herein set forth.

In testimony whereof I have signed my name to this specification in the presence of two subscribing witnesses.

GEORGE Y. CUSTER.

Witnesses:
 THOS. W. POTTS,
 JONATHAN J. STYER.